United States Patent [19]
Hiller

[11] Patent Number: 5,699,059
[45] Date of Patent: Dec. 16, 1997

[54] KEYBOARD INCORPORATING GAME PLAYER

[76] Inventor: Jeffrey H. Hiller, 4 Brittany Meadows, Atherton, Calif. 94027

[21] Appl. No.: 671,648

[22] Filed: Jun. 28, 1996

[51] Int. Cl.⁶ .................................................. H03M 11/00
[52] U.S. Cl. .......................... 341/22; 345/168; 365/708.1; 273/148 B
[58] Field of Search ................................. 341/22, 20, 23; 361/680; 200/6 A; 400/489, 487; 345/168, 169; 364/708.1; 273/148 B

[56] References Cited

U.S. PATENT DOCUMENTS

| | | | |
|---|---|---|---|
| 4,181,966 | 1/1980 | Wenninger et al. | 364/715 |
| 4,786,768 | 11/1988 | Langewis et al. | 200/6 A |
| 5,034,574 | 7/1991 | Martovitz | 200/6 A |
| 5,049,863 | 9/1991 | Oka | 340/710 |
| 5,245,320 | 9/1993 | Bouton | 345/167 |
| 5,307,297 | 4/1994 | Iguchi et al. | 364/708.1 |
| 5,319,582 | 6/1994 | Ma | 364/708.1 |
| 5,396,225 | 3/1995 | Okada | 340/825.21 |
| 5,411,341 | 5/1995 | Ullman | 400/489 |
| 5,438,331 | 8/1995 | Gilligan et al. | 341/35 |
| 5,442,378 | 8/1995 | Yasuhara et al. | 345/168 |
| 5,452,960 | 9/1995 | Kuhlenschmidt | 400/487 |
| 5,551,701 | 9/1996 | Bouton | 345/168 |

OTHER PUBLICATIONS

IBM Thinkpad Advertisement PC Magazine vol. 12 No.19 Nov. 9, 1993.

*Primary Examiner*—Jeffery Hofsass
*Assistant Examiner*—Albert K. Wong
*Attorney, Agent, or Firm*—Burns, Doane, Swecker & Mathis, LLP

[57] ABSTRACT

A game player is incorporated into a computer keyboard. Circuitry is provided for reading game code from a record-bearing medium. The medium may be a CD, DVD or other optical disk, in which case a CD, DVD or other optical disk drive is provided. The medium may be a game cartridge, in which case a game cartridge socket is provided. The game player may be connected to the computer display through a separate cable in addition to the normal keyboard cable, either directly using a Y-type connector or through a video input port of the computer.

15 Claims, 4 Drawing Sheets

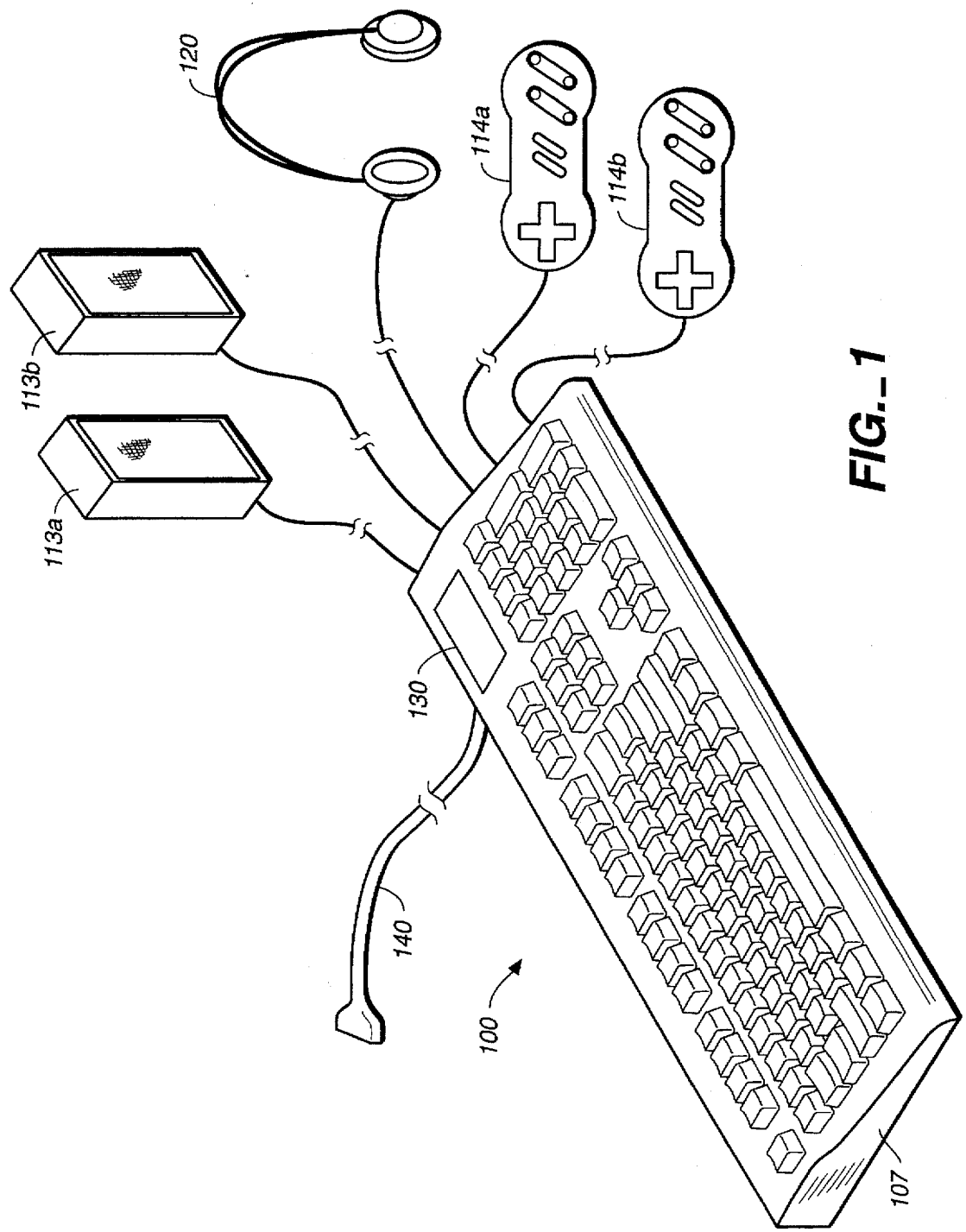
FIG._1

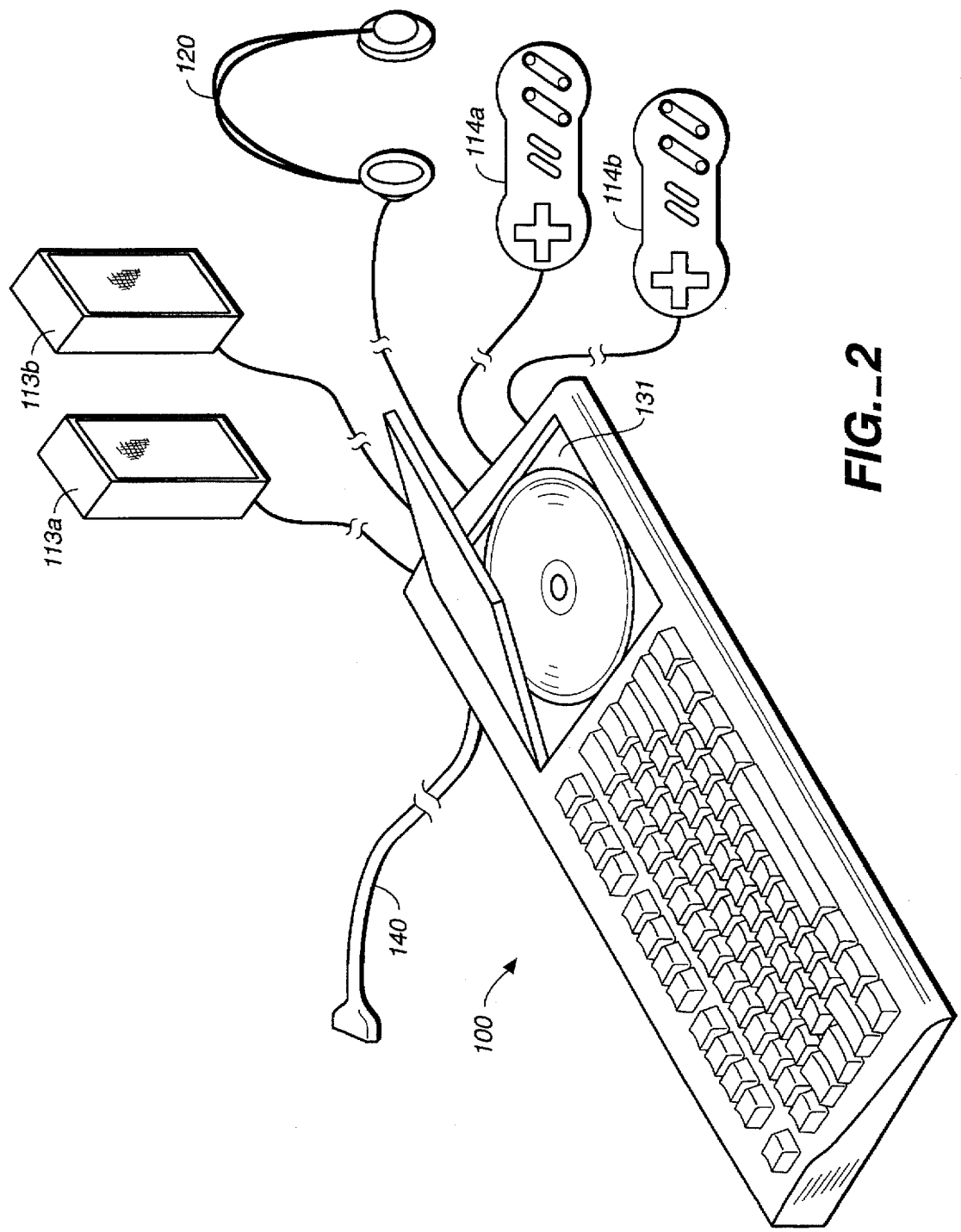
FIG._2

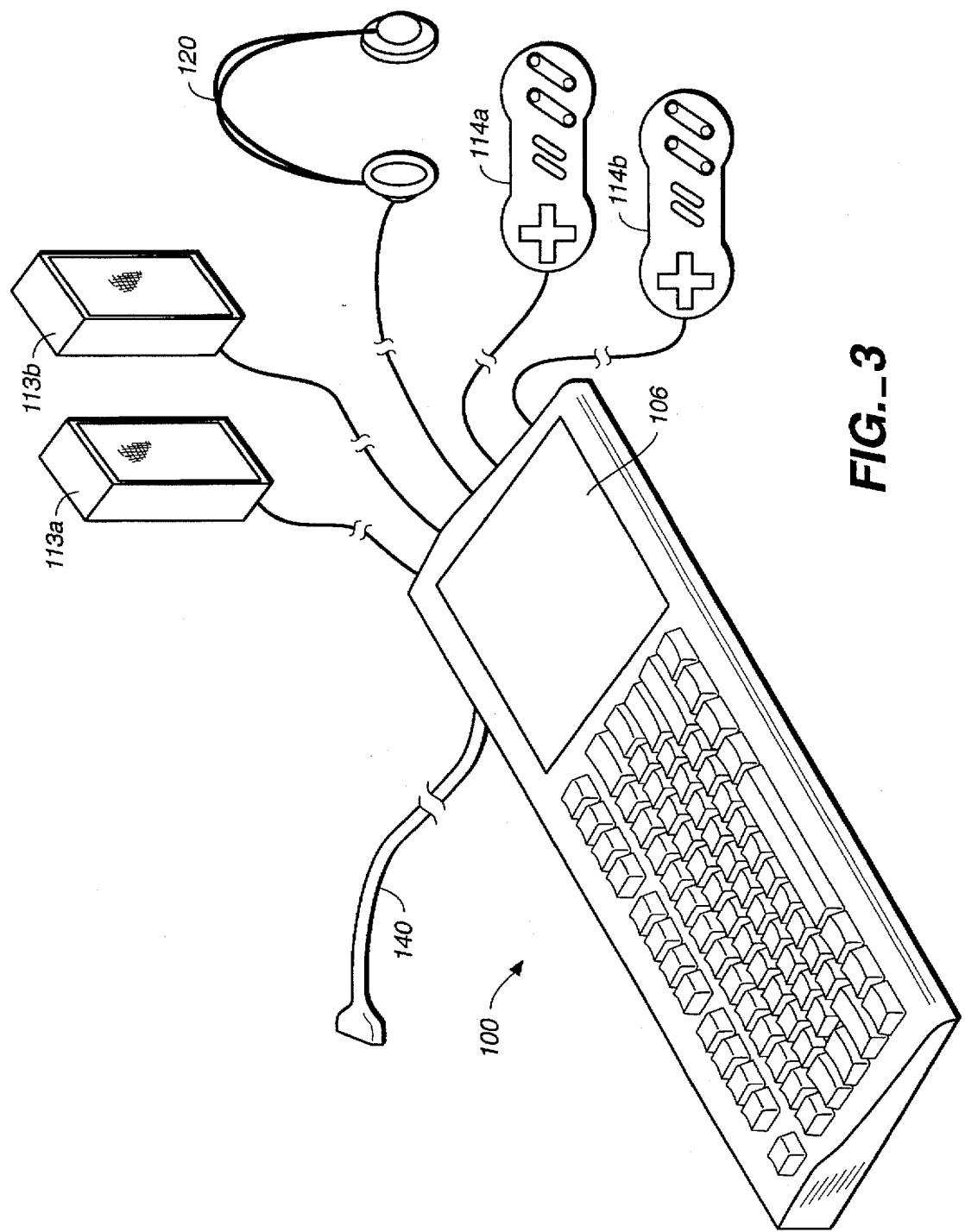
FIG._3

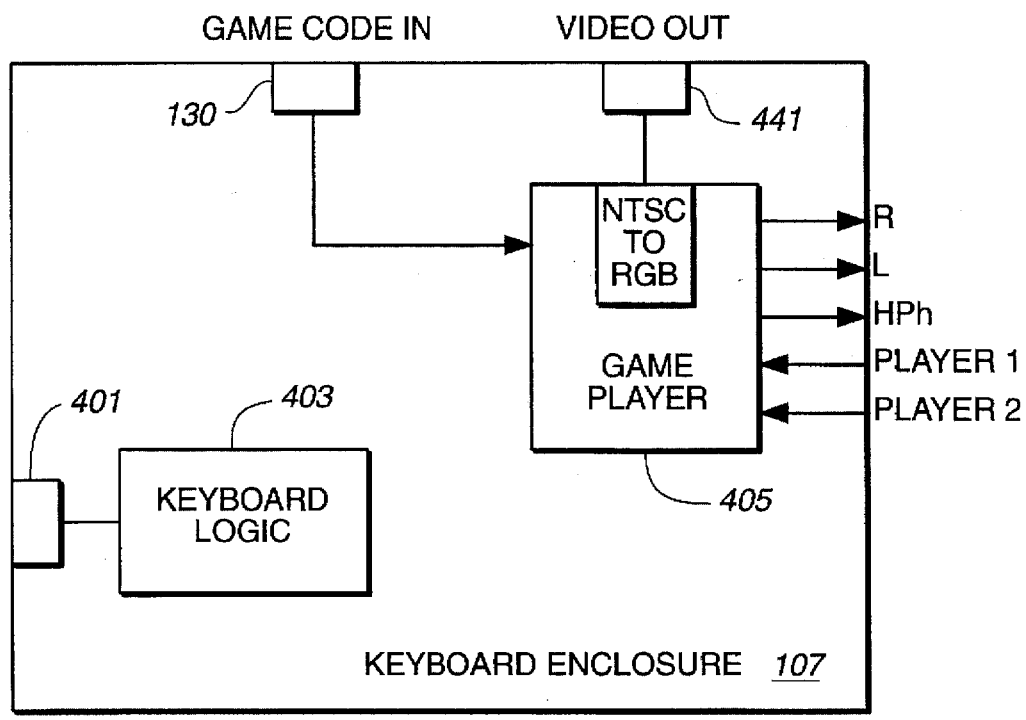
*FIG._4*
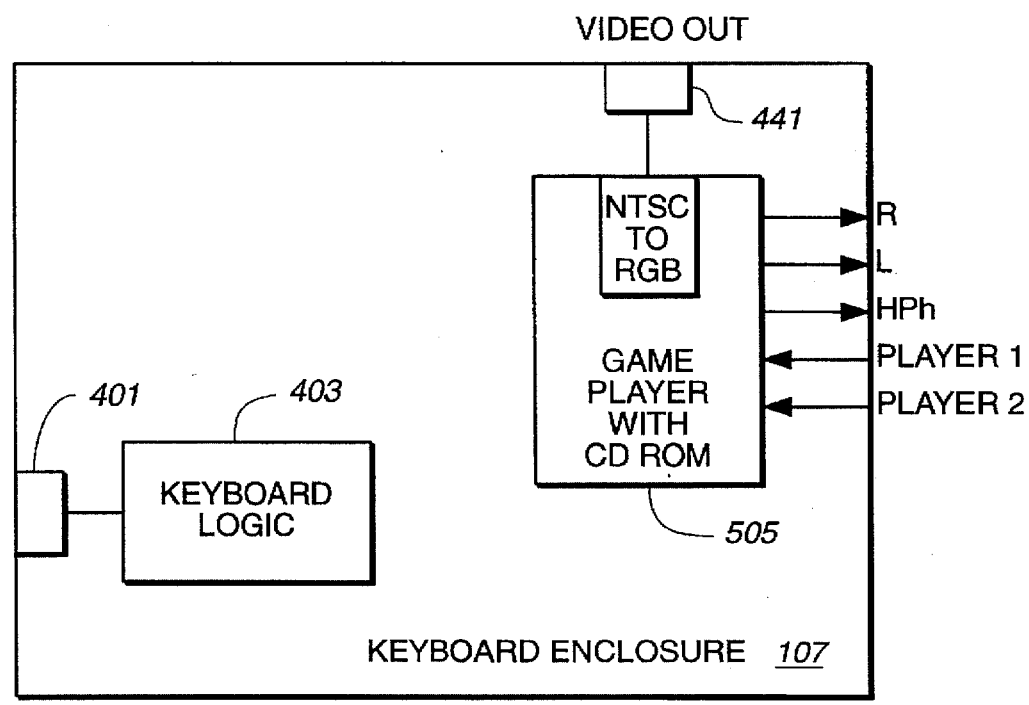
*FIG._5*

KEYBOARD INCORPORATING GAME PLAYER

BACKGROUND OF THE INVENTION

1. Field of the Invention

The present invention relates to computer I/O for personal computers.

2. State of the Art

Personal computing is presently in a state of flux as personal computers having computing power rivaling the mainframe computers of not many years ago become widely available at affordable prices. Available computing power has passed the threshold required for many computationally intensive tasks, making possible multimedia, or media-rich, computing without the need for expensive hardware. Because of strong consumer demand, opportunities for computer hardware and software companies have seldom seemed brighter, and personal computing appears to have nearly taken on the status of a national obsession.

The usefulness of personal computers, however, depends on the ability to connect to the computer varied peripheral devices including keyboard, mouse, display, printer, scanner, disk drive, modem, speakers, a microphone, etc. A typical computer is provided with specific connectors for many of these devices as well as general-purpose connectors that may serve any of a wide variety of devices. Despite the desirability of such expansion capabilities, the result is often a maze of cables and a crowded, visually distracting work area. To avoid this situation, computer makers are continually exercising trade-offs between what to include internal to the computer and what to provide external connections for. Still, as the breathtaking pace of innovation in personal computers continues, considerable difficulty remains in providing connections to the computer in order to achieve an attractive trade-off between functionality on the one hand and simplicity on the other.

Because of the popularity of computer games, a common peripheral device is a joystick or the like. The most engaging computer games, however, such as those sold by Sega, Nintendo and Sony, are not compatible with desktop computers but are designed for use with proprietary game machines. Such games machines incorporate custom hardware optimized for the fast display and manipulation of graphic images characteristic of the most exciting computer games. The market for such computer games could be greatly expanded by providing a computer that is primarily for household or business use with the additional capability of playing such games.

SUMMARY OF THE INVENTION

The present invention address the foregoing problem by first recognizing that the one peripheral device already present in the bulk of all desktop systems is a keyboard. In one embodiment of the invention, a game player is incorporated into the keyboard housing. Circuitry is provided for reading game code from a record-bearing medium. The medium may be a CD, DVD or other optical disk, in which case a CD, DVD or other optical disk drive is provided. The medium may be a game cartridge, in which case a game cartridge socket is provided. The game player may be connected to the computer display through a separate cable in addition to the normal keyboard cable, either directly using a Y-type connector or through a video input port of the computer.

BRIEF DESCRIPTION OF THE DRAWING

The present invention may be further understood from the following description in conjunction with the appended drawing. In the drawing:

FIG. 1 is a perspective view of a computer keyboard including a game cartridge socket;

FIG. 2 is a perspective view of a computer keyboard including an optical drive of the flip-top type, the drive being open;

FIG. 3 is a perspective view of a computer keyboard of FIG. 2 with the drive closed;

FIG. 4 is a hardware block diagram of one embodiment of the keyboard of FIG. 2; and FIG. 5 is a hardware block diagram of one embodiment of the keyboard of FIG. 2 and FIG. 3.

DETAILED DESCRIPTION OF THE PREFERRED EMBODIMENTS

Referring now to FIG. 2, a perspective view is shown of a keyboard 100 in accordance with one aspect of the invention. Within the keyboard 100 is provided a game player 105 (not shown). The game player is provided with circuitry for reading game code from a record-bearing medium. In FIG. 2, above the numeric keypad area of the keyboard there is provided a game cartridge socket 130 designed to accommodate game cartridges from such makers as Sega, Nintendo, etc. The game player and the keyboard share a common housing 107. Preferably, the game player is provided with a headphone output jack to allow for the use of headphone 120, outputs to accommodate one or more computer speakers (113a, 113b), and inputs for one or more game controllers (114a, 114b). The game player may be connected to the computer display through a separate cable 140 in addition to the normal keyboard cable, either directly using a Y-type connector or through a video input port of the computer. A volume control may be provided to adjust the sound output level. A control may also be provided to adjust the "speed," or sensitivity, of the controller inputs.

The record-bearing medium containing the game code, instead of being an optical disk, may be a game cartridge. Referring more particularly to FIG. 2, instead of a game cartridge, the medium is shown as being an optical drive 131 such as a CD ROM drive, DVD drive, etc. Game players such as the Sony Playstation™ use an optical drive. The optical drive may be incorporated within a numeric keypad area of the keyboard as described more fully in U.S. patent application Ser. No. 08/671,936 (Attorney's Docket Number 011910-007), filed on even date herewith and incorporated herein by reference.

As seen more clearly in FIG. 3, a lid of the CD ROM or other drive may be formed by a device 106 such as a membrane switch, touchpad, or touch-screen LCD display. At least in one mode of operation, the device 106 functions as a numeric keypad. The functionality of a numeric keypad is therefore preserved while additional functionality is added.

In the foregoing embodiment, if a touch-screen LCD display is provided, the touch-screen LCD display may be used to display a video portion of the game program. In this instance, the game player does not require any connection to a computer. Power for the game player may be obtained from the keyboard cable or from a separate power cord. In many instances, however, it will be desirable to connect the game player to a computer display, whether the record-bearing medium is an optical disk or a cartridge.

In one embodiment, a separate cable 140 is provided between the game player and the computer display. A Y-type connector may be provided such that the computer and the game player each provide separate video signals to the computer display. A keyboard command may be used to toggle between a mode in which the video signal from the computer is applied to the computer display and a mode in which the video signal from the computer is disabled, such that the video signal from the game player may be the only video signal applied to the computer display. The game player is modified somewhat from a conventional game player so as to produce an RGB video output signal instead of the usual NTSC video output signal.

In another embodiment, a separate cable is provided between the game player and a video input port of the computer. The computer controls internally whether a computer-generated video signal is applied to the computer display or whether the video signal from the game player is applied to the computer display.

Referring to FIG. 4, a hardware block diagram is shown of the keyboard of FIG. 1. Within a keyboard enclosure 107, keyboard logic 403 is coupled to a serial port 401. Within the same enclosure 107 is provided a game player 405. The game player 405 receives game code through the game code socket 130. An NTSC to RGB converter within the game player formats the video output of the game player for a computer screen. The video output from the converter is coupled to a video output port 441. The game player produces right and left speaker outputs (R,L), a headphone output (HPh), and receives game controller inputs (PLAYER 1, PLAYER2).

Referring to FIG. 5, in the embodiment of FIG. 2 and FIG. 3, the game player 505 includes a CD ROM or other drive, replacing game cartridge socket 130. In other respects, the keyboard of FIG. 5 is substantially the same as that of FIG. 4.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. A computer keyboard comprising:
   a keyboard housing;
   a key mechanism coupled to keyboard logic for capturing keystroke information;
   a communications port coupled to the keyboard logic for communicating keystroke information to an exterior of the keyboard housing; and
   a game player;
   wherein the keyboard logic and the game player are both housed within the keyboard housing.

2. The keyboard of claim 1, wherein said game player comprises a data storage device.

3. The keyboard of claim 2, wherein said data storage device is a disk drive.

4. The keyboard of claim 3, wherein said game player comprises circuitry for producing a video signal for display on a computer monitor.

5. The keyboard of claim 4, wherein said keyboard comprises a video port for receiving said video signal and conveying said video signal for display on a computer monitor.

6. The keyboard of claim 2, wherein said data storage device is an optical storage device.

7. The keyboard of claim 4, wherein said optical storage device is a CD ROM drive.

8. The keyboard of claim 5, wherein said game player further comprises a headphone jack.

9. The keyboard of claim 5, further comprising a touch panel mounted within the keyboard housing with a touch surface exposed to the exterior of the keyboard housing, the touch panel being coupled to the game player to control operation of the game player.

10. The board of claim 7, wherein said touch panel is part of an LCD touchscreen display, said game player further comprising means for displaying touch areas on said LCD touchscreen display.

11. The keyboard of claim 8, wherein in one mode of operation, said touch areas correspond to keys of a numeric keypad.

12. The keyboard of claim 4, wherein said optical storage device is a DVD drive.

13. The keyboard of claim 1, wherein said keyboard comprises a game cartridge socket coupled to said game player.

14. The keyboard of claim 13, wherein said game player comprises circuitry for producing a video signal for display on a computer monitor.

15. The keyboard of claim 14, wherein said keyboard comprises a video port for receiving said video signal and conveying said video signal for display on a computer monitor.

* * * * *